United States Patent
Gaidon et al.

(10) Patent No.: US 9,443,320 B1
(45) Date of Patent: Sep. 13, 2016

(54) MULTI-OBJECT TRACKING WITH GENERIC OBJECT PROPOSALS

(71) Applicant: Xerox Corporation, Norwalk, CT (US)

(72) Inventors: Adrien Gaidon, Grenoble (FR); Eleonora Vig, Grenoble (FR)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/714,505

(22) Filed: May 18, 2015

(51) Int. Cl.
*G06K 9/00* (2006.01)
*G06T 7/20* (2006.01)
*G06T 7/00* (2006.01)

(52) U.S. Cl.
CPC ............... *G06T 7/2033* (2013.01); *G06K 9/00* (2013.01); *G06T 7/004* (2013.01); *G06T 2207/10016* (2013.01); *G06T 2207/20081* (2013.01)

(58) Field of Classification Search
CPC .. G06K 9/4671; G06K 9/628; G06K 9/3233; G06K 9/4676; G06K 9/6218; G06K 9/6293; G06K 9/00536; G06K 9/6292; G06K 9/00664; G06K 9/6267; G06K 9/6256; G06K 9/00281; G06K 9/00825; G06K 9/00268; G06K 9/00261; G06K 9/3241; G06K 9/46; G06K 9/00711; G06K 9/00771; G06K 9/00221; G06T 2207/20081; G06T 7/2033; G06T 7/2086; G06T 7/0042; G06T 2207/10016; G06T 2207/10012; G06T 2207/20076; G06T 7/0046; A61B 19/5244; A61B 2019/5265; A61B 5/7267; G06F 17/30271; G06F 17/30705; G06F 17/3079; G06F 17/30247; G06F 17/2765; H04N 1/40; H04N 5/23222; H04N 5/2312; H04N 13/0468

USPC ........ 382/103, 131, 141, 155, 159, 224, 225
See application file for complete search history.

(56) References Cited

U.S. PATENT DOCUMENTS

| | | | | |
|---|---|---|---|---|
| 5,390,258 | A * | 2/1995 | Levin | G01R 33/5608 382/131 |
| 6,198,833 | B1 * | 3/2001 | Rangan | G06K 9/32 382/103 |
| 8,855,430 | B1 * | 10/2014 | Alldrin | G06F 17/30268 382/224 |
| 9,141,196 | B2 * | 9/2015 | Sheng | G06F 3/017 |

(Continued)

OTHER PUBLICATIONS

U.S. Appl. No. 14/505,301, filed Oct. 2, 2014, Adrien Gaidon, et al.

(Continued)

*Primary Examiner* — Vu Le
*Assistant Examiner* — Aklilu Woldemariam
(74) *Attorney, Agent, or Firm* — Fay Sharpe LLP (57) ABSTRACT

A tracking system and method are suited to tracking multiple of objects of different categories in a video sequence. A sequence of video frames is received and a set of windows is extracted from each frame in turn, based on a computed probability that the respective window contains an object, without reference to any specific category of object. For each of these windows, a feature representation is extracted. A trained detector for a selected category detects windows that constitute targets in that category, based on the respective feature representations. More than one detector can be used when there is more than one category of objects to be tracked. A target-specific appearance model is generated for each of the targets (e.g., learned or updated, if the target is present in a prior frame). The detected targets are tracked over one or more subsequent frames based on the target-specific appearance models of the targets.

19 Claims, 3 Drawing Sheets

(56) References Cited

U.S. PATENT DOCUMENTS

| | | | |
|---|---|---|---|
| 2003/0128877 A1* | 7/2003 | Nicponski | G06K 9/6269 382/224 |
| 2005/0147303 A1* | 7/2005 | Zhou | G06K 9/6206 382/190 |
| 2007/0005356 A1 | 1/2007 | Perronnin | |
| 2007/0258648 A1 | 11/2007 | Perronnin | |
| 2008/0069400 A1* | 3/2008 | Zhu | G06K 9/3241 382/103 |
| 2008/0069456 A1 | 3/2008 | Perronnin | |
| 2009/0144033 A1 | 6/2009 | Liu et al. | |
| 2010/0092084 A1 | 4/2010 | Perronnin et al. | |
| 2010/0098343 A1 | 4/2010 | Perronnin et al. | |
| 2010/0189354 A1 | 7/2010 | de Campos et al. | |
| 2010/0191743 A1 | 7/2010 | Perronnin et al. | |
| 2010/0272366 A1* | 10/2010 | Meng | G06K 9/6857 382/190 |
| 2010/0318477 A1 | 12/2010 | Perronnin et al. | |
| 2011/0026831 A1 | 2/2011 | Perronnin et al. | |
| 2011/0040711 A1 | 2/2011 | Perronnin | |
| 2011/0091105 A1 | 4/2011 | Perronnin | |
| 2011/0137898 A1 | 6/2011 | Gordo | |
| 2012/0005534 A1* | 1/2012 | Li | G06F 11/008 714/26 |
| 2012/0045134 A1 | 2/2012 | Perronnin et al. | |
| 2012/0076401 A1 | 3/2012 | Sanchez et al. | |
| 2012/0143853 A1 | 6/2012 | Gordo et al. | |
| 2013/0016877 A1* | 1/2013 | Feris | G06K 9/00771 382/103 |
| 2013/0064444 A1 | 3/2013 | Gordo et al. | |
| 2013/0279800 A1* | 10/2013 | Ranganathan | G06K 9/469 382/159 |
| 2013/0287251 A1* | 10/2013 | Mitsui | G06K 9/6267 382/103 |
| 2013/0290222 A1 | 10/2013 | Gordo et al. | |
| 2013/0322733 A1* | 12/2013 | Tarnowski | G06T 7/0004 382/141 |
| 2014/0125781 A1* | 5/2014 | Hirai | G06K 9/00228 348/51 |
| 2014/0185925 A1* | 7/2014 | Datta | G06K 9/6256 382/159 |
| 2015/0057995 A1* | 2/2015 | Neumann | G06K 9/00765 704/8 |
| 2015/0178953 A1* | 6/2015 | Gao | G06F 17/2765 345/681 |
| 2015/0179219 A1* | 6/2015 | Gao | G06K 9/00664 386/278 |
| 2015/0248586 A1* | 9/2015 | Gaidon | G06K 9/00711 382/103 |

OTHER PUBLICATIONS

U.S. Appl. No. 14/195,150, filed Mar. 3, 2014, Adrien Gaidon, et al.
Alexe, et al., "Measuring the objectness of image windows," PAMI, 34(11) pp. 2189-2202 (2012).
Arbeláez, et al., "Multiscale combinatorial grouping," CVPR, pp. 328-335, (2014).
Bach, et al.,"Non-strongly-convex smooth stochastic approximation with convergence rate $O(1/n)$," NIPS 26: 773-781 (2013).
Bernardin, et al., "Evaluating Multiple Object Tracking Performance: The CLEAR MOT Metrics," EURASIP Journal on Image and Video Processing, vol. 2008, Article ID 246309, pp. 1-10 (2008).
Breitenstein, et al., "Online Multi-Person Tracking-by-Detection from a Single, Uncalibrated Camera," IEEE PAMI, vol. 33, No. 9, pp. 1820-1333 (2011).
Breitenstein, et al., "Robust tracking-by-detection using a detector confidence particle filter," ICCV, pp. 1515-1522 (2009).
Carreira, et al., "Constrained Parametric Min-Cuts for Automatic Object Segmentation," CVPR, pp. 3241-3248 (2010).
Cheng, et al., "BING: Binarized normed gradients for objectness estimation at 300fps," CVPR, pp. 3286-3293 (2014).
Cinbis, et al., "Segmentation driven object detection with Fisher vectors," ICCV, pp. 2968-2975 (2013).
Collins, et al., "Hybrid Stochastic/Deterministic Optimization for Tracking Sports Players and Pedestrians," ECCV, pp. 298-313 (2014).
Dollár, et al., Fast feature pyramids for object detection, PAMI vol. 36, No. 8, pp. 1532-1545 (2014).
Donahue, et al., "DeCAF: A Deep Convolutional Activation Feature for Generic Visual Recognition," Proc. Int'l Conf. on Machine Learning (ICML), pp. 647-655, (Jun. 2014).
Everingham, et al., "The Pascal Visual Object Classes (VOC) Challenge," IJCV, 88(2), pp. 303-338 (2010).
Evgeniou, et al., "Regularized multi-task learning," SIGKDD, pp. 1-10 (2004).
Fan, et al., "Liblinear: A library for large linear classification," JMLR, vol. 9, pp. 1871-1874 (2008).
Geiger, et al., "3D Traffic Scene Understanding from Movable Platforms," PAMI, 36:5, pp. 1012-1025 (2014).
Geiger, et al., "Are we ready for autonomous driving? The KITTI vision benchmark suite," CVPR, pp. 3354-3361 (2012).
Girshick, et al., "Rich feature hierarchies for accurate object detection and semantic segmentation," CVPR, pp. 580-587 (2014).
Hall, et al., "Online, Real-Time Tracking Using a Category-to-Individual Detector," ECCV, Lecture Notes in Computer Science, vol. 8689, pp. 361-376 (2014).
Hosang, et al., "How good are detection proposals, really?" BMVC, pp. 1-25, (2014).
Isard, et al., "Condensation-conditional density propagation for visual tracking," IJCV, vol. 29, pp. 5-28 (1998).
Jégou, et al., "Aggregating local image descriptors into compact codes," PAMI, 34:9, pp. 1704-1716 (2012).
Kalal, et al., "Tracking-learning-detection," IEEE TPAMI, vol. 34, No. 7, pp. 1409-1422 (2012).
Lowe, Distinctive image features from scale-invariant keypoints, IJCV, 60, pp. 91-110 (2004).
Milan, et al., "Continuous Energy Minimization for Multi-Target Tracking," PAMI, vol. 36, No. 1, pp. 58-72 (2014).
Perronnin, et al., "Fisher kernels on visual vocabularies for image categorization," CVPR, pp. 1-8 (2007).
Perronnin, et al., "Large-scale image retrieval with compressed fisher vectors," CVPR, pp. 3384-3391 (2010).
Pirsiavash, et al., "Globally-optimal greedy algorithms for tracking a variable number of objects," CVPR, pp. 1201-1208 (2011).
Sánchez, et al., "High-dimensional signature compression for large-scale image classification," CVPR 2011, pp. 1665-1672 (2011).
Sánchez, et al., "Image Classification with the Fisher Vector: Theory and Practice," IJCV, vol. 105, No. 3, pp. 222-245 (2013).
Sánchez, et al., "Improving the fisher kernel for large-scale image classification," Proc. 11th European Conference on Computer Vision, Part IV, pp. 143-156 (2010).
Van De Sande, et al., "Segmentation as selective search for object recognition," ICCV, pp. 1879-1886 (2011).
Zitnick, et al., "Edge Boxes: Locating Object Proposals from Edges," ECCV, Lecture Notes in Computer Science, vol. 8693, pp. 391-405 (2014).

* cited by examiner

MULTI-OBJECT TRACKING WITH GENERIC OBJECT PROPOSALS

BACKGROUND

The exemplary embodiment relates to the automatic analysis of video data and finds particular application in connection with Multi-Object Tracking (MOT), which entails automatically detecting and tracking objects of a known category, such as cars, in video streams.

Generic object detection methods have been used for predicting a limited set of candidate object locations that are likely to contain an object, whatever category it might belong to, by relying on general properties of objects (e.g., contours). For many applications, the ability to detect and locate specific objects in images provides useful information. In Multi-Object Tracking, given a video stream and a semantic class, e.g., "car" or "pedestrian," the goal is to track individual objects in the class in the frames of the video stream as they move over time. The image regions where the objects are likely to be present are most commonly predicted by rectangles referred to as bounding boxes or windows. The windows can vary in size and aspect ratio, depending on the anticipated size and shape of the object. Object detection is a challenging task, due in part to the variety of instances of objects of the same class, to the variety of imaging conditions (viewpoints, environments, lighting), and to the scale of the search space (typically millions of candidate regions for a single frame).

Existing object detection algorithms cast detection as a binary classification problem: given a candidate window and a candidate class, the goal is to determine whether the window contains an object of the considered class, or not. This generally includes computing a feature vector describing the window and classifying the feature vector with a detector, e.g., a binary classifier, such as a linear SVM. The detector is applied in a sliding window fashion across the frame and the location with the maximal score identifies the possible new location of the target object. A sliding window may be used to scan a large set of possible candidate windows. In this approach, a window is moved stepwise across the image in fixed increments so that a decision is computed for multiple overlapping windows. For example, a HOG detector combined with a boosted cascade has been used to link person detections into tracks. See, Breitenstein, et al., "Robust tracking-by-detection using a detector confidence particle filter," ICCV, pp. 1515-1522, 2009.

In practice, this approach uses windows of different sizes and aspect ratios to detect objects at multiple scales, with different shapes, and from different viewpoints. Consequently, millions of windows are tested per image. The computational cost is, therefore, one of the major impediments to practical implementation. There have recently been attempts to speed up the costly exhaustive search by leveraging fast to compute low-level features with cheap classifiers. For example, Hall et al., "Online, Real-Time Tracking Using a Category-to-Individual Detector," ECCV 2014, relies on the Aggregated Channel Features of Dollár, et al., "Fast feature pyramids for object detection," PAMI 2014 (hereinafter, Dollár 2014), and a cascade of boosted classifiers for learning individual-object detectors. The method aims to reduce the complexity of single feature extraction/classification, however, the complexity is the same as for the standard sliding window approach.

More recent object detectors have been developed which avoid exhaustive sliding window searches. Instead, they use a limited set of category-agnostic object location proposals, generated using general properties of objects (e.g., contours), and overlapping most of the objects visible in an image. These proposals are then ranked using a category-specific classifier. See, for example, van de Sande, et al., "Segmentation as selective search for object recognition," ICCV, pp. 1879-1886, 2011 (hereinafter, "van de Sande 2011"; Cinbis, et al., "Segmentation driven object detection with Fisher vectors," ICCV, pp. 2968-2975, 2013, hereinafter, "Cinbis 2013"; Girshick, et al., "Rich feature hierarchies for accurate object detection and semantic segmentation," CVPR, 2014. However, such object proposals have not been adapted for tracking.

Existing MOT algorithms rely on recent improvements in the field of object detection. See, for example, Breitenstein, et al., "Online Multi-Person Tracking-by-Detection from a Single, Uncalibrated Camera," IEEE PAMI, 33:9, pp. 1820-1333 (2011), hereinafter, "Breitenstein 2011"; Pirsiavash, et al., "Globally-optimal greedy algorithms for tracking a variable number of objects," CVPR, pp. 1201-1208, 2011, hereinafter, "Pirsiavash 2011"; Milan, et al., "Continuous Energy Minimization for Multi-Target Tracking," PAMI, 36:1, pp. 58-72, 2014; Geiger, et al., "3D Traffic Scene Understanding from Movable Platforms," PAMI, 36:5, pp. 1012-1025, 2014, hereinafter, "Geiger 2014"; Hall, et al., "Online, Real-Time Tracking Using a Category-to-Individual Detector," ECCV, 2014; Collins, et al., "Hybrid Stochastic/Deterministic Optimization for Tracking Sports Players and Pedestrians," ECCV, 2014. Tracking-by-detection (TBD) is a standard method for object tracking in monocular video streams. It relies on the observation that an accurate appearance model is enough to reliably track an object in a video. Therefore, most MOT approaches look for the best way to link detections into tracks, thus, directly relying on object detection performance.

INCORPORATION BY REFERENCE

The following references, the disclosures of which are incorporated herein by reference in their entireties, are mentioned:

U.S. Ser. No. 14/505,031, filed Oct. 2, 2014, entitled EFFICIENT OBJECT DETECTION WITH PATCH-LEVEL WINDOW PROCESSING, by Adrien Gaidon, et al.

U.S. application Ser. No. 14/195,150, filed Mar. 3, 2014, entitled SELF-LEARNING OBJECT DETECTORS FOR UNLABELED VIDEOS USING MULTI-TASK LEARNING, by Adrien Gaidon, et al.

The following relate generally to object classification: U.S. Pub. Nos. 20070005356, 20070258648, 20080069456, 20090144033, 20100092084, 20100098343, 20100189354, 20100191743, 20100318477, 20110026831, 20110040711, 20110091105, 20110137898, 20120045134, 20120076401, 20120143853, 20130064444, and 20130290222.

BRIEF DESCRIPTION

In accordance with one aspect of the exemplary embodiment, a tracking method includes, for each of a plurality of frames in a sequence of frames, identifying a set of windows based on a computed probability that the respective window contains an object. For each identified window, a multi-dimensional feature representation of the window is extracted. With a trained detector, based on the extracted multi-dimensional feature representations, a set of targets is detected. Each target in the set includes a respective one of the windows that is predicted to contain an object in a selected category. A respective target-specific appearance model is generated (e.g., learned or updated) for each of the targets. At least one of the targets in the set is tracked for at least one subsequent frame, the tracking being based on the target-specific appearance model generated for that target.

At least one of the identifying of the set of windows, detecting targets, and tracking of the targets may be performed with a processor.

In accordance with another aspect of the exemplary embodiment, a tracking system includes a generic proposal extractor which, for each of a plurality of frames in a sequence of frames, identifies a set of windows based on a computed probability, for each window, that the window contains an object. A feature extractor is provided for extracting a multi-dimensional feature representation of each identified window in the set. An object detection component is provided for detecting a set of targets based on the extracted multi-dimensional feature representations. Each target in the set includes a respective one of the windows that is predicted to contain an object in a selected category. An appearance model component is provided for generating a respective target-specific appearance model for each of the targets in the set. A tracking component is provided for tracking at least one of the targets in the set for at least one subsequent frame. The tracking is based on the target-specific appearance model generated for that target. A processor implements the generic proposal extractor, feature extractor, object detection component, appearance model component, and tracking component.

In accordance with another aspect of the exemplary embodiment, a tracking method includes, for a first frame in a sequence of frames, identifying a first set of windows based on a computed probability, for each window in the first set, that the window contains an object. For each identified window in the first set, a multi-dimensional feature representation of the window is extracted. With a trained detector, based on the extracted multi-dimensional feature representations, a first set of targets is detected, each target in the first set including a respective one of the windows that is predicted to contain an object in a selected category. A respective target-specific appearance model is learned for each of the targets in the first set. A location is predicted for each of the targets in the first set in a next frame of the sequence. For the next frame in the sequence of frames the method includes identifying a second set of windows based on a computed probability, for each window in the second set, that the window contains an object. For each identified window in the second set, a multi-dimensional feature representation of the window is extracted. With a trained detector, based on the extracted multi-dimensional feature representations, a second set of targets is detected. Each target in the second set includes a respective one of the windows that is predicted to contain an object in a selected category, the second set of targets including at least one of the targets in the first set which is identified based on its predicted location and appearance model.

At least one of the identifying of the sets of windows, extracting the multi-dimensional feature representations, and detecting the sets of targets may be performed with a processor.

DETAILED DESCRIPTION

Aspects of the exemplary embodiment relate to a system and method for object tracking, which is suited to Multi-Object Tracking (MOT). The system and method thus enable automatic detection and tracking objects of a known category or categories in a video stream.

In various embodiments, the system and method address the problem of tracking multiple objects in videos: generic object proposals (candidate windows) are suggested in each frame, features are extracted from each proposal, and the proposal-level predictions are then linked together using a particle filter (one per target) to track the target over the sequence of frames. Various heuristics may be employed to decide when to create a new target or when to merge two targets. The method also improves the transferability across domains as fewer hypotheses are made by a generic object proposal generation algorithm, as opposed to a sliding-window-based algorithm.

The method is shown in illustrative examples to be useful as yielding high accuracy, scalability and transferability. Accuracy is increased, for example, by rejecting many unlikely hypotheses and by allowing the use of more costly models. The scalability of the tracking algorithm is improved, for example, through feature sharing between proposals. The transferability across domains is improved, for example, since fewer hypotheses are made by a generic object proposal generation algorithm as opposed to a sliding-window-based algorithm.

As used herein, the term "object" refers to an inanimate object (or group of inanimate objects), such as a vehicle, license plate, other article of manufacture, building, or the like, or to an animate object (or group of inanimate objects), such as a person or group of people, or an animal or group of animals. In particular, the term "object" refers to a physical object that can be imaged by cameras used by the system.

Example categories of object include moving/moveable objects, such as vehicles (or a specific class of vehicles, e.g., cars), animals (or a specific class of animals, e.g., people). While illustrative embodiments describe the detection of cars and people, it is to be appreciated that other categories are also contemplated. Each category encompasses a set of at least two objects, and generally many more different objects, rather than a single object.

The exemplary system and method employ an MOT algorithm which is based on generic object proposals for detecting a set of candidate objects. In the exemplary generic object proposal part of the method, the aim is to predict a limited set of candidate object locations that are likely, a priori, to contain an object, irrespective of the category to which it belongs. Generic object proposals look for features of objects in general, such as edge and contour density, for detecting objects. Once the candidate objects have been identified in a frame, they are classified using one or more classifiers which have been trained to detect objects which are in specific categories of interest, such as cars or people. The output from the classifiers can be combined with tracking information which is derived from other frames in the video sequence in order to track specific objects across multiple frames.

Figure 1:
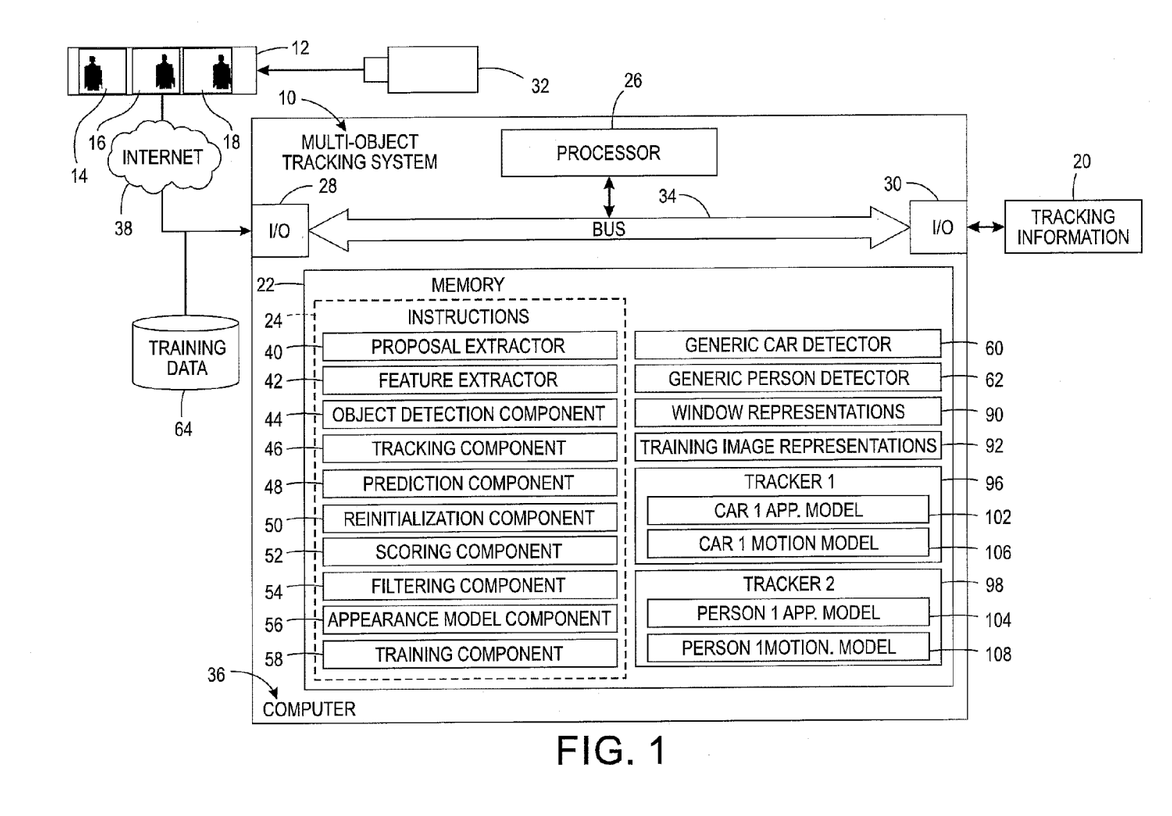
FIG. 1 is a functional block diagram of a system for object tracking in accordance with one aspect of the exemplary embodiment.

With reference to FIG. 1, a computer-implemented system 10 for object tracking is illustrated. The system takes as input a video sequence 12 of images or "frames" 14, 16, 18, etc., captured at successive times, and outputs tracking information 20, based on objects detected in the sequence. The system 10 includes memory 22, which stores instructions 24 for performing the method described with reference to FIG. 2, and a processor device 26 in communication with the memory for executing the instructions. One or more network input/output (I/O) interfaces 28, 30 are provided for receiving the sequence 12 from a sequence capture device, such as a video camera 32 and for outputting the information 20 based thereon. Hardware components 22, 26, 28, 30 of the system communicate via a data/control bus 34. The system 10 may be hosted by one or more computing devices, such as the illustrated server computer 36. The system may communicate with external devices, such as capture device 32 or an intermediate server computer, via a wired or wireless network 38, such as the Internet.

The exemplary software instructions 24 include a generic proposal extraction component (proposal extractor) 40, a feature extractor 42, an object detection component 44, a tracking component 46, a prediction component 48, a reinitialization component 50, a scoring component 52, a filtering component 54, an appearance model component 56, and a training component 58.

The training component 58 is used in an off-line phase to pre-train an object detector, such as a classifier model (e.g., a binary classifier) 60, 62, etc. for each category of interest (e.g., cars, people, etc.), for use by the object detection component 44. The training may be performed using a general-purpose labeled dataset 64, which can be re-used across different scenes. The training data 64 may include a set of images, each comprising an object in the category of interest. The training component 58 may be omitted when training has been performed. In one embodiment, training is performed on a separate computing device and the trained detectors 60, 62 are input to the computer 36.

Figure 3:
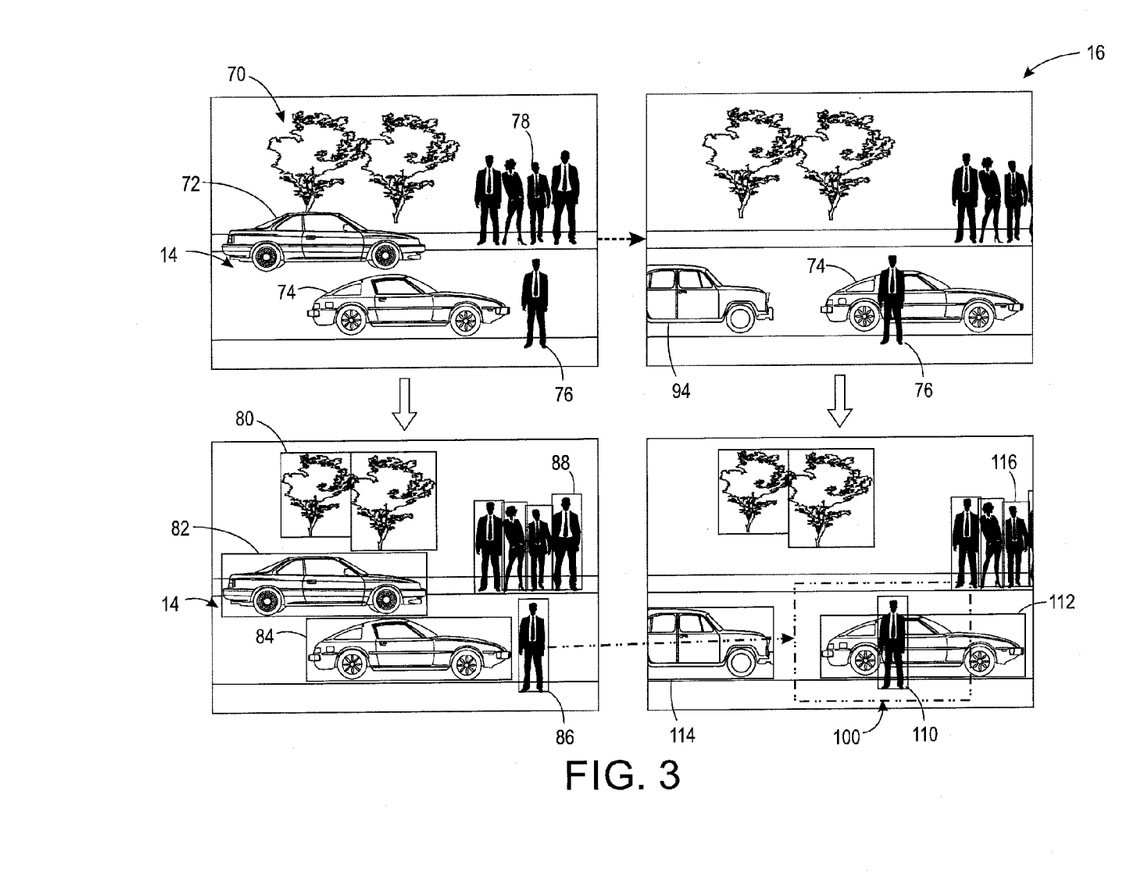
FIG. 3 schematically illustrates windows of different sizes extracted from a sequence of frames.

With reference also to FIG. 3, at runtime, the proposal extractor 40 takes as input a first frame 14 corresponding to a respective time t of the input video sequence 12. The frame may include one or more objects 70, 72, 74, 76, 78, etc. The proposal extractor 40 generates generic object proposals (i.e., predicts locations of the objects). The proposals may be in the form of a list of windows (bounding boxes) that are likely to contain any kind of object in the frame. For example, a set of windows 80, 82, 84, 86, 88, etc., is generated, each locating a candidate object. As is evident, some of the windows may locate objects which are not in any of the categories of interest.

The feature extractor 42 extracts visual features from each of the windows 80, 82, 84, 86, 88 and generates a multi-dimensional representation 90 of each bounding box therefrom. In a similar way, during training, the feature extractor 42 extracts features from each of the training images 64 and generates a multi-dimensional representation 92 of each training image therefrom. As will be appreciated, the training images may each correspond to a bounding box extracted by the proposal extractor 40 from a respective labeled (larger) training image.

The object detection component 44 uses the pre-trained generic category detectors 60, 62 to detect candidate targets 72, 74, 76, 78 (generic object proposals that are in one of the predefined categories) in the frame. For the first frame, each of the windows 82, 84, 86, 88, etc. that are predicted to include an object in one of the categories of interest is considered to include new targets.

New targets 94 are automatically detected by classifying, with the pre-trained classifiers 60, 62, all the proposals that do not overlap an already tracked target by at least a threshold amount (e.g., 30%). Each detected target is thus associated with a category probability for one (or more) of the categories of interest.

The tracking component 46 initializes a tracker 96, 98, etc. such as a particle filter, for tracking each object detected by the detection component 44. The particle filters are used to predict the location of each candidate target for the next frame based on its location in the current frame. As will be appreciated, the method need not process every frame captured in the video sequence, so the next frame may be the next frame that is selected for processing. For example, given frame 14, for time t, a prediction is made for each of the candidate targets 72, 74, 76, 78, etc. as to where they are likely to occur in frame 16 at time t+1. As an example, given bounding box 86, the particle filter 46 may predict that the respective target 76 will likely be present in a region 100 in the subsequent frame 16 (in reality, the location of each "particle" of the object proposal is predicted). The particle filter 96, 98 uses a target-specific appearance model 102, 104 and a respective motion model 106, 108 for scoring detected objects which may correspond to already tracked targets (those present in a prior frame), such as illustrative targets 74 and 76.

The reinitialization component 50 attempts to reinitialize the location of previously lost targets by classifying the features of each generic proposal with the last appearance model 102, 104 of each lost target, without using their previous locations in past frames.

The prediction component 48, which may be part of the tracking component, scores the candidate targets detected by the detection component 44 and reinitialization component 50 that are present in each frame. The prediction component 48 outputs a probability for each candidate target which is based on the likelihood of that specific candidate target being in its detected location, given its predicted location output of the particle filter.

The filtering component 54 filters out candidate targets based on predefined heuristics. For example, candidate targets that have been assigned a probability below a threshold $T_1$ (such as 50%) for their most probable category may be identified. These candidate targets are then temporarily "lost", i.e., they are not included as identified targets in the tracking information for that frame but their appearance model is stored for future use. Targets that overlap with the same higher scoring target by more than a threshold $T_2$ (such as 30%), for a minimum number of frames, such as at least 3 or at least 4 frames are removed from the set of targets. The filtered set of thus-identified targets is then stored in memory by location, category and a category ID (e.g., Person 1).

The appearance model component 56 generates (updates for existing targets or learns, for new targets) the appearance model 102, 104 of each visible (i.e., not lost) identified target by using the estimated location (bounding box) in the current frame t as a positive example, and random negative bounding boxes that do not overlap other (candidate) targets. Additional positive examples may be generated by shifting the bounding box for the target by a few pixels in one or more directions and/or by increasing or decreasing its size. Each of the detected targets is thus associated with a respective target-specific appearance model which is used to reidentify that target in subsequent frames.

The system 10 may be resident on one or more computing devices 36, such as a PC, such as a desktop, a laptop, palmtop computer, portable digital assistant (PDA), server computer, cellular telephone, tablet computer, pager, combination thereof, or other computing device capable of executing instructions for performing the exemplary method. As will be appreciated parts of the system 10 may be distributed over two or more computing devices.

The memory 22 may represent any type of non-transitory computer readable medium such as random access memory (RAM), read only memory (ROM), magnetic disk or tape, optical disk, flash memory, or holographic memory. In one embodiment, the memory 22 comprises a combination of random access memory and read only memory. In some embodiments, the processor 26 and memory 22 may be combined in a single chip.

The network interface 28, 30 allows the computer 36 to communicate with other devices via a wired or wireless link, such as a computer network, such as a local area network (LAN) or wide area network (WAN), or the Internet, and may comprise a modulator/demodulator (MODEM) a router, a cable, and and/or Ethernet port.

The digital processor 26 can be variously embodied, such as by a single-core processor, a dual-core processor (or more generally by a multiple-core processor), a digital processor and cooperating math coprocessor, a digital controller, or the like. The digital processor 26, in addition to controlling the operation of the computer 36, executes instructions stored in memory 22 for performing the method outlined in FIG. 2.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2:
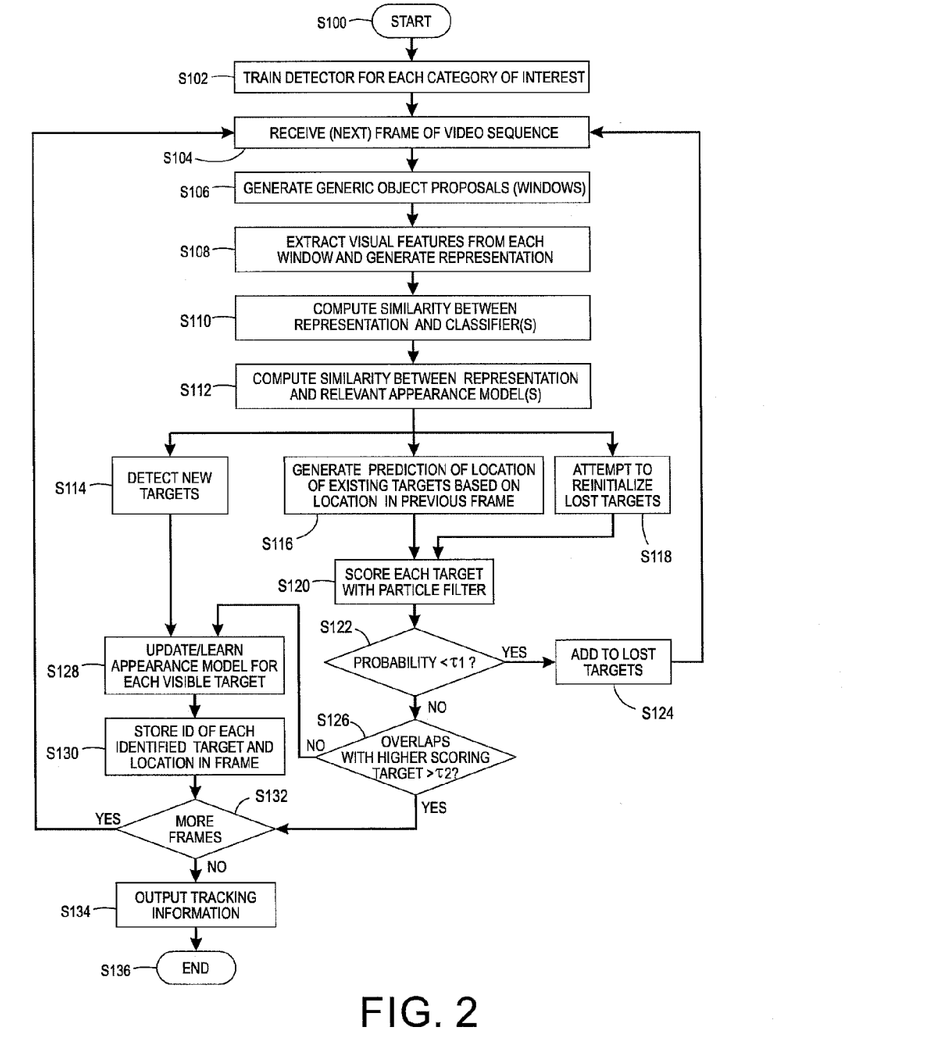
FIG. 2 is a flow chart illustrating a method for object tracking in accordance with another aspect of the exemplary embodiment.

With reference now to FIG. 2, a method for tracking targets in a video stream is illustrated. The method begins at S100.

At S102, which can be performed in an off-line phase, an object detector 60, 62 for the category of interest (e.g., cars or people) is trained using a general-purpose labeled dataset, which can be re-used across different scenes. A detector learning approach similar to that of Cinbis 2013 may be used, which is based on logistic regression and hard negative mining.

In the on-line tracking phase, the following procedure may be implemented whenever a new frame t is available from the video stream:

At S104, the next frame, such as frame 16, is received and may be temporarily stored in memory 22.

At S106, generic object proposals 110, 112, 114, 116, etc. (FIG. 3), are generated in an unsupervised manner. In particular, a list of k windows that are likely to contain any kind of object in the frame t is generated by the proposal extractor 40, based on a computed probability that the respective window contains an object.

At S108, visual features are extracted from each of the generic object proposals 110, 112, 114, 116, by the feature extractor 42.

At S110, the generic object proposals extracted at S108 are classified with the pretrained detectors 60, 62, based on their extracted visual features.

At S112, the generic object proposals extracted at S108 are classified with target specific appearance models 102, 104 (learned for targets detected in a prior frame), based on their extracted visual features.

At S114, new targets 94 are detected automatically by classifying, with the pre-trained detector(s) 60, 62 all the generic object proposals 102 that do not overlap, by more than the threshold amount, an already tracked target 74, 76, etc.

At S116, for each (non-new) target 74, 76 (and 78), a prediction of its location in the current frame t is made from its estimated location in the previous frame t−1 with the particle filter 46.

At S118, reinitialization may be performed to identify, if possible, the location(s) of any previously lost targets by classifying the proposal features with the last appearance model of each lost target, without using their previous locations in past frames. Any reinitialized targets are added to the list of candidate targets 74, 76, identified at S114 and S116.

At S120, each tracked target 74, 76, 78 is scored based on their likelihood estimated by the particle filter.

If at S122, a candidate target has a probability below the detector threshold $\tau 1$ (e.g., 50%) then at S124 it is stored separately in a list of temporarily lost targets (such as target 78). Otherwise, the method proceeds to S126.

If at S126, a candidate target overlaps with the same higher scoring target by more than a threshold $\tau 2$ (e.g., 30%) for at least a threshold number of frames then it is removed from consideration as corresponding to the same target. Otherwise, the method proceeds to S128.

At S128, a respective appearance model 102, 104, etc., of each visible (i.e., not lost) target 74, 76, 94, etc., is generated (i.e., updated, for existing targets, or learned, for new targets 94), by the appearance model component 56. This may be performed by using the estimated location in the current frame t as a positive example, and random negatives that do not overlap other targets as negative examples. The appearance models are stored in memory. Optionally, the generic detectors 60, 62 are updated based on at least some of the appearance models generated for the respective category.

At S130, the ID of each identified (visible) target and its location in the frame are stored.

At S132, if a new frame in the sequence is received, the method returns to S104, otherwise to S134.

At S134, tracking information 20 may be output, such as for each frame, one or more of the IDs and categories of the detected targets, and their locations. The method ends at S136.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 36, (for example, an internal hard drive of RAM), or may be separate (for example, an external hard drive operatively connected with the computer 36), or may be separate and accessed via a digital data network such as a local area network (LAN) or the Internet (for example, as a redundant array of inexpensive of independent disks (RAID) or other network server storage that is indirectly accessed by the computer 36, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method.

As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Further exemplary aspects of the method and system will now be described.

Complexity Analysis

The sharing of feature computations and use of generic object proposals in the method allows for considerable computational savings in detection operations, both with the category-level pre-trained detector(s) 60, 62 and also with the target-specific detectors used by the particle filters. Furthermore, when using linear object detectors 60, 62 the detection operations can be performed as efficient matrix-matrix products between a matrix of appearance models 94, 96 and a precomputed feature matrix (the visual representations 90 of the proposals), the latter being shared across models. Consequently, the Tracking Proposal (TP) algorithm has a per-frame complexity in:

$$C_{TP} = O((n_t + p) \cdot d + c)k) \quad (1)$$

where $n_t$ is the number of modeled targets (temporarily lost or currently tracked) in frame t, p is the number of categories modeled (e.g., 2 when interested in both cars and pedestrians), d is the feature dimensionality, k is the number of proposals per frame (e.g., fixed to k≈1000), c is the cost of extracting the features of one cell or image subregion, and assuming a "schoolbook" matrix multiplication implementation between dense matrices.

In contrast, traditional sliding window approaches are fully re-run across the full image for each model with no computations shared across models, as they rely on techniques that avoid the extraction of all the features at each possible location. Therefore, using a sliding window-based detector for a comparable tracking method yields a sliding tracker (ST) that is much less scalable in practice:

$$C_{ST} = O((n_t + p) \cdot c \cdot K(d)) \quad (2)$$

where $K(d) \gg d$ is the complexity of running a frame-wide sliding-window search with a single model.

Running the detectors is generally the computational bottleneck of TBD approaches to MOT. Therefore, the exemplary algorithm results in a significant overall reduction in the computational cost amortized over targets and categories. In addition, the computational efficiency incurred by using generic object proposals for tracking allows leveraging of more complex features and classifiers than what are commonly used for efficient tracking, such as the boosted cascade on low-level features of Breitenstein 2011.

Generation of Generic Object Proposals (S106)

The generation of generic object proposals (windows) is achieved without predicting a category of the respective object, but rather is based on properties which most objects have in common. In this step, a maximum (or total) number of generic object proposals per frame 14, 16 may be set, such as 1000 or 5000, which limits the number of windows which can be generated. Additionally or alternatively, a probability threshold may be set, which excludes all candidate object proposals which are below a predefined threshold probability of containing an object. Setting the (maximum) number of generic object proposals per frame is a tradeoff between accuracy and efficiency—the more windows, the more likely it is that objects of interest will be found but at the expense of computation time. The proposal extractor 40 may extract any number of such windows, such as at least 100 windows per frame, depending on the content of the frame.

The generation of object proposals can proceed in an unsupervised fashion, without placing limits on the size (total number of pixels) and/or shape (number of pixels in each dimension) of the windows. For example they can be of any size which is up to the size of the entire frame. The windows typically overlap one another, thus a given object may be found in more than one window.

Several methods are available for generation of object proposals. Hosang, et. al., "How good are detection proposals, really?" BMVC 2014, gives an overview of a number of methods. As examples, any of the following may be used separately or in combination: selective search (van de Sande 2011); objectness (Alexe, et al., "Measuring the objectness of image windows," PAMI 2012), constrained parametric min-cuts (Carreira, et al., "Constrained Parametric Min-Cuts for Automatic Object Segmentation," CVPR, pp. 3241-3248, 2010), multiscale combinatorial grouping (Arbeláez, et al., "Multiscale combinatorial grouping," CVPR 2014), BING (Cheng, et al. "BING: Binarized normed gradients for objectness estimation at 300 fps," CVPR 2014), and edge boxes (Zitnick, et al., "Edge Boxes: Locating Object Proposals from Edges," ECCV, Lecture Notes in Computer Science, Vol. 8693, pp. 391-405, 2014).

In one exemplary embodiment (used in the examples below), the edge boxes of Zitnick and Dollár 2014 are employed. This method relies on the assumption that the number of contours wholly enclosed by an image segment is a good predictor of the existence of an object in that window. These proposals are particularly adapted for tracking for two main reasons: they yield a good accuracy with a limited computational cost (0.02 seconds per image with the original non-optimized Matlab code from the authors), and their main assumption (an object contains more wholly enclosed contours than a typical background area) is likely to hold true in real-world tracking applications, both due to the typical objects of interest (e.g., people, vehicles), and to the nature of the background in real-world tracking scenes (e.g., road scenes), where large portions of the visual field are large amorphous areas, such as roads, sidewalks, and sky.

However, other generic object proposal methods can be used with the tracking-by-detection framework.

Feature Extraction (S102, S108)

The feature extraction component used in training and detection extracts features from each of the windows identified at S106 (or from the training images) and generates a representation of the window based on the extracted features. Suitable features can be extracted at a patch level, e.g., by extracting multiple patches from the window and for each patch, extracting low level features, such as color and/or gradient features, which are then aggregated, e.g., concatenated, to form a patch descriptor. A multi-dimensional window-level (or training image) representation 90, 92 is generated from the patch descriptors. Each representation 90, 92 includes the same number of features (dimensions), such as at least 50, or at least 100, or at least 1000 features, and in some embodiments, up to 1 million, or up to 100,000, or up to 5000 features.

In one embodiment, a high-dimensional feature representation, such as a Fisher Vector (FV) representation, is used for object detection. Such representations are normally too computationally expensive for sliding window-based detection. Briefly, the FV involves computing the gradient of the log-likelihood of a descriptor (such as a patch descriptor) with respect to the parameters of an underlying generative model, such as a Gaussian Mixture Model (GMM). The Gaussian mixture model includes a set of Gaussian functions, from which all the local descriptors are presumed to be emitted. Each Gaussian function can be represented by a set of parameters which include the mean vector and covariance matrix. Each local descriptor can thus be characterized by a vector of weights, one for each considered parameter of each Gaussian function. For example, there may be at least 1, or at least 16, or at least 32, or at least 64, or at least 128, or at least 512 Gaussians in the GMM. It can be assumed that the covariance matrices are diagonal. Square-rooting and global normalization of the vectors can be used. Dividing the window into cells can be used to yield a vector for each cell, which can then be aggregated to provide spatial information in the final window representation. See, for example, Sanchez, et al., "Image classification with the Fisher vector: Theory and practice," IJCV, 105(3):222-245, 2013; Perronnin, et al., "Improving the fisher kernel for large-scale image classification," Proc. 11$^{th}$ European Conference on Computer Vision (ECCV): Part IV, pp. 143-156, 2010; Sanchez, et al., "High-dimensional signature compression for large-scale image classification," CVPR 2011; Perronnin, et al., "Fisher kernels on visual vocabularies for image categorization," CVPR 2007; and U.S. Pub. Nos. 20120076401 and 20120045134, the disclosures of which are incorporated herein by reference in their entireties. The trained GMM is intended to describe the content of any image within a range of interest (for example, objects present in street scenes).

In the Examples described below, the method of Cinbis et al. is loosely followed, with modifications designed to build detectors that are computationally efficient enough for tracking, both in terms of speed and memory consumption. For these detectors, the local patches are extracted densely from each frame at 8 scales (with 12×12-sized patches at the lowest scale). The patches are represented by SIFT (gradient) features (see, Lowe, "Distinctive image features from scale-invariant keypoints," IJCV, 60:91-110, 2004), and projected to 64 dimensions using PCA. The projected descriptors are then encoded as an FV via a single Gaussian, which is a way to drastically reduce FV dimensionality while maintaining acceptable performance (see, Perronnin, et al., "Large-scale image retrieval with compressed fisher vectors," CVPR, pp. 3384-3391, 2010). A coarse geometry is taken into account by spatial pooling: the window is subdivided into a regular grid of 4×4 cells, with each cell being described by a FV. The per-cell and per-window FVs are concatenated into a final 2176-dimensional signature to which square-rooting and l2 normalization is applied to generate the window representation 90.

As will be appreciated, higher-dimensional representations generally yield higher recognition performance, but at higher cost in terms of both speed and memory. In the MOT method, however, where the target representations are persistently stored for re-identification, the storage costs could be considerable. The relatively low dimensional signatures used in the Examples offer a good efficiency and accuracy trade-off, making them particularly suitable for use in tracking by detection. However, with greater memory capacity, the size of the representations may be less significant.

It should also be noted that the exemplary tracking proposal algorithm can be applied using any feature representation that represents features of the pixels of the widow, such as deep learning (convolution or neural network-based) representations. See, for example, Donahue, et al., "DeCAF: A Deep Convolutional Activation Feature for Generic Visual Recognition," ICML, pp. 647-655, June 2014.

Training Object Detectors (S102) and Object Detection (S110)

In the training, the same type of feature-based multidimensional representation as is used for the detection is used. Each of a set of training images 64 is manually labeled with an object category, such as car or person. For each category, representations 92 of images which are labeled with the category are used as positive training images and images that are labeled with a different category, or with no category of interest, are used negative samples for training the respective detector 60, 62, etc.

Classifier training may be performed with the method of Cinbis, et al., "Segmentation driven object detection with Fisher vectors," ICCV, pp. 2968-2975, 2013), e.g., based on logistic regression and hard negative mining.

The trained classifiers 60, 62, are then used for object detection.

In some embodiments, the detectors 60, 62 are adapted to the domain of interest using data collected in the on-line phase. For example, a plurality of learned individual appearance models, generated at S128 for those generic object proposals which have a threshold (high) probability for the category with a respective initial detector 60, are combined to generate an updated category-level detector 60.

In the on-line tracking phase, whenever a new frame t is available from the video stream, the generic object proposals 80, 82, 84, 86, 88, 112 are scored with at least one of the learned category-specific linear classifiers 60, 62. Classifier 60 is parameterized by a vector $w \in \mathbb{R}^d$, where d is the dimensionality of the representation. The classifier returns the probability that a candidate window x, represented by a feature vector $\phi_t(x) \in \mathbb{R}^d$, in frame $z_t$, contains an object of the category of interest with a probability $P(x|z_t; w)$, which is a function of the product of the classifier vector w and the window's feature vector 90, e.g.:

$$P(x|z_t;w)=(1+e^{-w^T\phi_t(x)})^{-1} \quad (3)$$

The appearance model (vector) 62, $w_i$ can similarly be used in Eq. (3) in place of w to compute the probability that a window includes a previously-identified object i in the window: $P(x|z_t; w_i)=(1+e^{-w_i^T\phi_t(x)})^{-1}$.

The classifier(s) 60, 62 may be learned (at S102), for example, via logistic regression. For example, the classifier vector w may be estimated via logistic regression, using a regularized empirical risk minimization algorithm based on the logistic loss:

$$l_t(x,y,w) = \log(1 + \exp(-yw^T \phi_t(x))) \quad (4)$$

where y is the known label (e.g., a binary label, e.g., car or not). w is updated iteratively to minimize the loss.

This equation gives calibrated probabilities with Eq. (3), and has useful theoretical properties for on-line optimization (see, Bach et al., "Non-strongly-convex smooth stochastic approximation with convergence rate O(1/n)," NIPS 26: 773-781, 2013).

Tracking of Targets (S114-S120)

The detected targets in any frame (apart from the first) may include one or more new targets (those not seen before), one or more existing targets that were seen in the previous frame, and/or one or more reinitialized targets that were not seen in the prior frame but were seen in one or more preceding frames and subsequently lost. The tracking process for each type of target can proceed slightly differently.

For each existing target, the tracking component 46 makes a prediction, of that target's location in the current frame from its estimated location in the previous frame at t−1 using the particle filter initialized for that target (S116). This may employ causal TBD approaches, as described, for example, Breitenstein 2011; Isard et al., "Condensation-conditional density propagation for visual tracking," IJCV, vol. 29, pp. 5-28, 1998.

Other suitable methods for tracking of existing targets are described in above-mentioned U.S. Ser. No. 14/505,031. The method disclosed therein employs a tracking-by-detection algorithm which is based on Positive-Negative (P-N) learning (see, for example, Z. Kalal, et al., "Tracking-learning-detection," IEEE TPAMI 34(7):1409-1422 (2012), "Kalal 2012"), but extends this framework to the tracking of multiple targets using multi-task learning. Applying this to the exemplary method, given a bounding box 86 for a given target, the tracker predicts one or more candidate, bounded object regions 100 within which the object instance 76 is predicted to be located in at least one subsequent image in the sequence 12. The predicted object region(s) is/are stored.

For scoring the existing targets, each tracker may utilize the respective instance-level appearance detector, e.g., appearance model 94, which has previously been initialized for the respective detected target, and a respective motion model 110, which predicts the candidate object region 100. In the exemplary embodiment, the particle filter uses the generic model for the category in addition to the target specific model for scoring windows. In one embodiment, the appearance model parameters for the appearance detectors that are used by each tracker may be jointly learned with a regularized multi-task learning framework (see, T. Evgeniou and M. Pontil, "Regularized multi-task learning," SIGKDD (2004), hereinafter, "Evgeniou 2004", for a discussion of multi-task learning). In joint learning, each appearance model is updated online to adapt to a specific object 76 and its variations observed across the video, while being constrained to share features with the other appearance models through multi-task regularization.

Targets seen previously but not in the prior frame may be reinitialized based on their previously initialized appearance models, without taking into account location prediction. The tracker thus uses the appearance model 94 alone for scoring the lost targets, and may require a higher score to validate the detection at S122.

The new targets are the remaining candidate targets which do not meet the required similarity threshold (at S112) for any of the appearance models previously learned. For the new targets not seen in any of the preceding frames, a particle filter appearance model and motion model are initialized in the current frame, which are then used in subsequent frames for detection of existing targets and predicting their locations.

In various embodiments disclosed herein, the exemplary tracking proposal method has several advantages over the standard sliding window tracking-by-detection approaches. These include improved tracking accuracy, due to better object detection; scalability to a large number of targets (and categories) by sharing feature computations; and transferability across domains, both in terms of robustness to domain change and for explicit domain adaptation.

Employing generic object proposals in MOT can yield better accuracy. Generic proposals allow the search space of candidate locations to be substantially reduced. For any object, the candidate locations may be reduced to about a thousand hypotheses per frame. Consequently, more powerful detectors can be used than those commonly used in tracking (typically based on sliding window).

The exemplary method allows sharing of feature computations across all detectors (for any target and category) by leveraging the fact that proposals are both category- and target-independent. The computational savings are particularly evident when many targets (of possibly different categories) are to be tracked. This enables the method to scale to common practical scenarios such as tracking in crowds or long-term tracking of different objects.

The object proposals can also be employed for domain adaptation. In practice, the distributions of training and test data for MOT may differ, as several tracking cameras 32 may be deployed on a large camera network or cameras may be on mobile platforms (e.g., a camera mounted on a vehicle). Since the object proposal part of the method relies on generic properties of objects, such as edge and contour density, they are inherently agnostic to the data source, and therefore, suitable for domain adaptation.

The method and system may find application, for example, in the domain of enforcement: e.g., cameras installed in school buses to detect vehicles overtaking the bus when it is stopped, cameras installed in fixed locations or street-sweeping vehicles to detect speed violations, bus lane enforcement from fixed or mobile cameras, and for on-street parking occupancy measurement.

The method described herein can provide a sufficient accuracy, while simultaneously reducing setup and operational costs.

Without intending to limit the scope of the exemplary embodiment, the following examples demonstrate the application of the method.

EXAMPLES

Datasets: The exemplary method is evaluated for car tracking performance on 21 training videos of the publicly-available KITTI tracking challenge (Geiger, et al., "Are we ready for autonomous driving? The KITTI vision benchmark suite," CVPR, pp. 3354-3361, 2012), which is available at http://www.cvlibs.net/datasets/kitti/eval_tracking-.php. The dataset consists of videos recorded from a moving platform while driving in and around the city of Karlsruhe in Germany. This is a challenging dataset, designed to investigate how computer vision algorithms perform on real-world data typically found in robotics and autonomous driving applications. These sequences have a high resolution of 1242×375, and vary significantly in terms of number of frames, number of objects, camera motion, and imaging conditions. The training videos are used to compare the exemplary method to different baselines. The ground truth tracks of the test videos are not publicly available, and the KITTI challenge evaluation server does not allow for repeated submissions. While the KITTI benchmark provides a tracking training set, in the exemplary method, the detectors are pre-trained on a separate dataset. The KITTI videos are all treated as unseen. The exemplary detectors perform unsupervised on-line domain adaptation. Therefore, the exemplary method does not use the available ground truth tracks on these sequences in any way. The ground truth is used only to evaluate performance after the trackers have finished parsing the videos. The trackers are run on each video independently, as (i) this corresponds to the standard practice in tracking evaluation, and (ii) the on-line algorithm described herein depends on the order of the frames, so evaluating the method on an arbitrary concatenation of all videos would be impacted by the order in which the algorithm sees the videos.

Pre-training: a generic car detector is pre-trained on the training images from the standard Pascal VOC 2007 detection challenge (Everingham, et al., "The Pascal visual object classes (VOC) challenge," IJCV, 88(2), pp. 303-338, 2010). As this dataset is general-purpose, it is reasonable to expect it to yield pre-trained models likely to transfer to more specific tasks/domains, to a certain extent at least (which is measured in the experiments). However, there are some striking differences between data sets. For example, images from the VOC data set which include vehicles often include only a single vehicle which occupies a large proportion of the image and may be set against a very different background from what is experienced in the KITTI data set, anticipating difficulty of transfer. The detector pre-training is performed off-line via batch logistic regression, using liblinear (Fan, et al., "LIBLINEAR: A library for large linear classification," *JMLR*, 2008), with hard negative mining as described in Cinbis 2013. The mini-FV GMM model (1 Gaussian) yields close to 40% Average Precision (AP), which is 18% below the results of Cinbis 2013 for a fraction of the cost. Although logistic regression provides calibrated probabilities in theory, it was found that the pre-training tends to yield an overconfident detector. Therefore a simple re-calibration step is applied on the pre-training data to operate at 33% recall (i.e., detecting only a third of the objects on the Pascal test set), which yields around 60% precision on the Pascal test set.

Performance metrics: the KITTI evaluation protocol is followed by using the CLEAR MOT metrics (Bernardin, et al., "Evaluating Multiple Object Tracking Performance: The CLEAR MOT Metrics," EURASIP J. on Image and Video Processing, Vol. 2008, Article ID 246309, 2008), including the MOT Accuracy (MOTA, composed of the false positive and negative rates, as well as the number of identity switches), MOT Precision (MOTP), Fragmentation (FRAG), and IDentity Switches (IDS), complemented by the Mostly Tracked (MT) and Partly Tracked (PT) ratios, as well as Precision (P), Recall (R), and False Alarm Rate (FAR). The public evaluation code from the KITTI tracking benchmark: (http://kitti.is.tue.mpg.de/kitti/devkit_tracking.zip) is used.

Baselines: The exemplary Tracking Proposal (TP) method is compared to a comparable sliding-window MOT baseline (ST). The ST method uses the same tracking algorithm described herein, with the difference that the detection operations are performed using the standard sliding window technique, instead of using proposals as in the TP method. In particular, the efficient sliding window approach described in U.S. Ser. No. 14/505,031 is used for the ST method and for the trackers used in the exemplary TP method.

In addition, variants of these algorithms, termed TP-DA and ST-DA, that include a domain adaptation step as described in U.S. application Ser. No. 14/195,150, are evaluated (updating generic detectors based on generated appearance models).

Additionally, the TP method is compared to two off-line TBD algorithms that yield good results on KITTI: off-line Association Based Tracking (ABT) type methods: DP_MCF, as described in Pirsiavash 2011, and G_TBD, as described in Geiger 2014. For fair comparisons, the authors' original tracking code was combined with the proposal-based detections of the TP method.

Quantitative Tracking Results

Table 1 shows tracking performance metrics for the different methods compared over all KITTI videos. The metrics represent different tracking performance indicators (noted above), which should increase with higher performance, except for FAR (false alarm rate), IDS (identity switches), and FRAG (fragmentation). Methods with an asterisk are off-line, the others are causal/on-line.

TABLE 1

Tracking results

| Method | MOTA | MOTP | MT | PT | R | P | FAR | IDS | FRAG |
|---|---|---|---|---|---|---|---|---|---|
| DP_MCF* | 1.8 | 74.7% | 0.0% | 1.2% | 1.9% | 94.2% | 0.4% | 6 | 26 |
| G_TBD* | 7.4 | 71.8% | 0.2% | 10.9% | 9.5% | 82.4% | 6.3% | 9 | 138 |
| ST | 7.4 | 70.9% | 0.0% | 17.0% | 12.8% | 71.5% | 15.9% | 84 | 123 |
| ST-DA | 10.0% | 71.1% | 0.7% | 15.4% | 12.4% | 78.1% | 6.2% | 57 | 1262 |
| TP | 16.0% | 72.4% | 0.7% | 29.9% | 21.1% | 80.7% | 15.7% | 57 | 167 |
| TP-DA | 19.7% | 74.5% | 1.1% | 34.3% | 23.5% | 86.4% | 11.5% | 55 | 232 |

The results in Table 1 suggest that the exemplary Tracking Proposal (TP) method consistently outperforms all others in terms of the overall MOT Accuracy (MOTA), which is composed of the false negative rate, false positive rate, and number of identity switches. This means that the Tracking Proposal method allows a good trade-off between precision and recall to be obtained. Indeed, Table 1 shows that the exemplary Tracking Proposal method allows tracking (mostly and partly) more targets than the other methods, by improving recall while maintaining a high precision, although this comes at the cost of an increase in identity switches and track fragmentation.

When compared with the ST baseline, the exemplary TP method shows an improvement across almost all metrics. For example MOTA and recall are about twice as high, for a higher precision (both MOTP and P). This suggests that the generic proposals used in the TP method are not only well-suited to object detection but also for MOT, as evidenced by the results. These conclusions also hold when using domain adaptation to account for the fact that the TP detectors are pre-trained on a different dataset. This illustrates that the generic nature of object proposals makes them particularly suited for domain adaptation, both in terms of robustness to domain discrepancy, or when explicitly performing domain adaptation.

Additionally, it can be seen that the exemplary TP method significantly outperforms existing TBD methods (DP_MCF and G_TBD), which have been considered to give very good results on this data set. Although they optimize data association across the entire video sequences, they only manage to generate the few "easy" tracks, as evidenced by their high precision (as measured by the high MOTP, P, and low FAR) for a low recall (as measured by the low MOTA, MT, PT, and R metrics). This indicates that the performance of these association-based tracking methods is driven by the quality of the detections, while the exemplary on-line domain adaptation method can efficiently extract useful information from an initially imperfect detector.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A tracking method comprising:
   for each of a plurality of frames in a sequence of frames:
   with a generic proposal extractor which detects locations of candidate object by searching the frame for features of objects in general, identifying a set of windows based on a computed probability, for each window, that the window contains an object based on at least one of edge and contour density in the frame, without predicting a category of the respective object, by setting at least one of:
   a maximum or total number of windows per frame; and a probability threshold, which excludes windows which are below a predefined threshold probability of containing an object;
   for each identified window, extracting a multi-dimensional feature representation of the window;
   with a trained detector, based on the extracted multi-dimensional feature representations, detecting a set of targets, each target in the set comprising a respective one of the windows that is predicted to contain an object in a selected category, a respective target-specific appearance model being generated for each of the targets;
   tracking at least one of the targets in the set for at least one subsequent frame, the tracking being based on the target-specific appearance model generated for that target,
   wherein at least one of the identifying of the set of windows, detecting targets, and tracking the targets is performed with a processor.

2. The method of claim 1, further comprising training the detector on multi-dimensional feature vectors extracted from labeled training images.

3. The method of claim 2, wherein the multi-dimensional feature vectors are based on a generative model which includes at least one Gaussian function.

4. The method of claim 1, further comprising, for a target of an immediately preceding frame which is not detected in a current frame, storing the target as a lost target.

5. The method of claim 1, further comprising providing for reinitializing a lost target not detected in an immediately preceding frame of the video sequence, based on an appearance model for that target.

6. The method of claim 1, further comprising filtering out targets which overlap a higher scoring target for a threshold number of frames.

7. The method of claim 1, wherein the tracking is also based on a motion model which predicts a location in a next frame for a target of a current frame.

8. The method of claim 1, wherein the tracking includes predicting a location of one of the targets in a next frame of the sequence and scoring windows in the next frame that contain an object in the selected category, based on the predicted location and an appearance model generated for the target in a current frame.

9. The method of claim 1, wherein the identifying of the set of windows is based on at least one of selective search, objectness, constrained parametric min-cuts, multiscale combinatorial grouping, binarized normed gradients, and edge boxes.

10. The method of claim 1, wherein the identifying of the set of windows includes identifying a predefined number of windows in the frame.

11. The method of claim 1, further comprising learning a respective target-specific appearance model for each of the targets that has not been identified in preceding frames and updating an existing target-specific appearance model for each of the targets that has been identified in a preceding frame.

12. The method of claim 1, wherein the trained detector includes a plurality of detectors, one for each of a set of selected categories.

13. The method of claim 12, wherein the same feature representation of each window is used by each of the detectors.

14. The method of claim 1 wherein the selected category is selected from a people category and a vehicle category.

15. The method of claim 1, further comprising outputting information based on at least one of the tracked targets.

16. A computer program product comprising a non-transitory recording medium storing instructions, which when executed on a computer, causes the computer to perform the method of claim 1.

17. A system comprising memory which stores instructions for performing the method of claim 1 and a processor in communication with the memory which executes the instructions.

18. A tracking system comprising:
   a generic proposal extractor which, for each of a plurality of frames in a sequence of frames, identifies a set of windows based on a computed probability, for each window, that the window contains an object, the computed probability being based on at least one of edge and contour density in the frame, the windows being identified by setting at least one of:
   a maximum or total number of windows per frame; and a probability threshold, which excludes windows which are below a predefined threshold probability of containing an object;
   a feature extractor for extracting a multi-dimensional feature representation of each identified window in the set;

an object detection component for detecting a set of targets based on the extracted multi-dimensional feature representations, each target in the set comprising a respective one of the windows that is predicted to contain an object in a selected category;

an appearance model component for generating a respective target-specific appearance model for each of the targets in the set;

a tracking component for tracking at least one of the targets in the set for at least one subsequent frame, the tracking being based on the target-specific appearance model generated for that target; and a processor which implements the generic proposal extractor, feature extractor, object detection component, appearance model component, and tracking component.

19. A tracking method comprising:

for a first frame in a sequence of frames:
  identifying a first set of windows based on a computed probability, for each window in the first set, that the window contains an object, the computed probability being based on at least one of edge and contour density in the frame, the first set of windows being identified by setting at least one of:
  a maximum or total number of windows per frame; and
  a probability threshold, which excludes windows which are below a predefined threshold probability of containing an object;
  for each identified window in the first set, extracting a multi-dimensional feature representation of the window;
  with a trained detector, based on the extracted multi-dimensional feature representations, detecting a first set of targets, each target in the first set comprising a respective one of the windows that is predicted to contain an object in a selected category;
  learning a respective target-specific appearance model for each of the targets in the first set; and
  predicting a location for each of the targets in the first set in a next frame of the sequence;

for the next frame in the sequence of frames:
  identifying a second set of windows based on a computed probability, for each window in the second set, that the window contains an object the computed probability being based on at least one of edge and contour density in the frame;
  for each identified window in the second set, extracting a multi-dimensional feature representation of the window, and
  with a trained detector, based on the extracted multi-dimensional feature representations, detecting a second set of targets, each target in the second set comprising a respective one of the windows that is predicted to contain an object in a selected category, the second set of targets including at least one of the targets in the first set which is identified based on its predicted location and appearance model;

wherein at least one of the identifying of the sets of windows, extracting the multi-dimensional feature representations, and detecting the sets of targets is performed with a processor.

* * * * *